United States Patent
Shiimoto et al.

(10) Patent No.: US 8,879,205 B2
(45) Date of Patent: Nov. 4, 2014

(54) HIGH SPIN-TORQUE EFFICIENCY SPIN-TORQUE OSCILLATOR (STO) WITH DUAL SPIN POLARIZATION LAYER

(71) Applicant: HGST Netherlands B.V., Amsterdam (NL)

(72) Inventors: Masato Shiimoto, Odawara (JP); Keiichi Nagasaka, Isehara (JP); Masukazu Igarashi, Kawagoe (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/675,796

(22) Filed: Nov. 13, 2012

(65) Prior Publication Data

US 2014/0133048 A1 May 15, 2014

(51) Int. Cl.
*G11B 5/127* (2006.01)
*G11B 5/31* (2006.01)
*G11B 21/02* (2006.01)

(52) U.S. Cl.
CPC ............... *G11B 5/127* (2013.01); *G11B 5/313* (2013.01); *G11B 21/02* (2013.01)
USPC ........................ 360/125.3; 360/110

(58) Field of Classification Search
USPC ............... 360/125.3–125.32, 125.71–125.75, 360/110, 128
See application file for complete search history.

(56) References Cited

U.S. PATENT DOCUMENTS

| | | | |
|---|---|---|---|
| 6,603,677 B2 | 8/2003 | Redon et al. | |
| 8,057,925 B2 | 11/2011 | Horng et al. | |
| 8,203,389 B1* | 6/2012 | Zhou et al. | 331/3 |
| 2008/0019040 A1* | 1/2008 | Zhu et al. | 360/110 |
| 2008/0268291 A1* | 10/2008 | Akiyama et al. | 428/812 |
| 2009/0225465 A1* | 9/2009 | Iwasaki et al. | 360/75 |
| 2011/0090603 A1 | 4/2011 | Bai | |
| 2011/0096443 A1* | 4/2011 | Zhang et al. | 360/324.2 |
| 2011/0216436 A1 | 9/2011 | Igarashi et al. | |
| 2011/0279921 A1 | 11/2011 | Zhang et al. | |
| 2012/0126905 A1* | 5/2012 | Zhang et al. | 331/94.1 |

OTHER PUBLICATIONS

Zhu et al., "Microwave Assisted Magnetic Recording," 2007 IEEE, IEEE Transactions on Magnetics, vol. 44, No. 1, Jan. 2008, pp. 125-131.

Matsubara et al., "Experimental Feasibility of spin-torque oscillator with synthetic field generation layer for microwave assisted magnetic recording," 2011 American Institute of Physics, Journal of Applied Physics, vol. 109, pp. 07B741/1-07B741/3.

(Continued)

*Primary Examiner* — Adam B Dravininkas
(74) *Attorney, Agent, or Firm* — Zilka-Kotab, PC

(57) ABSTRACT

In one embodiment, a MAMR head includes a main magnetic pole, a STO positioned near the main magnetic pole, the STO including a first perpendicular magnetic layer positioned above the main magnetic pole, wherein the first perpendicular magnetic layer is a first spin polarization layer having an axis of magnetic anisotropy in a direction perpendicular to a film surface, a first non-magnetic transmission layer positioned above the first perpendicular magnetic layer, a magnetic layer effectively having a plane of easy magnetization in the film surface positioned above the first non-magnetic transmission layer, the magnetic layer being a FGL, a second non-magnetic transmission layer positioned above the magnetic layer, and a second perpendicular magnetic layer positioned above the second non-magnetic transmission layer, wherein the second perpendicular magnetic layer is a second spin polarization layer having magnetic anisotropy in the direction perpendicular to the film plane.

20 Claims, 11 Drawing Sheets

(56) References Cited

OTHER PUBLICATIONS

Hayakawa et al., "Current-Induced Magnetization Switching in MgO Barrier Magnetic Tunnel Junctions with CoFeB Based Syntehtic Ferrimangetic Free Layers," http://arxiv.org/ftp/arxiv/papers/0801/0801.1355.pdf, pp. 1-6, Oct. 2006.

Ikeda et al., "Magnetic Tunnel Junctions for Spintronic Memories and Beyond," 2007 IEEE, IEEE Transactions on Electron Devices, vol. 54, No. 5, May 2007, http://layer.uci.agh.edu.pl/~mczapkie/Research/SV/articles/Ikeda_Magnetic%20Tunnel%20Junctions%20for%20Spintronic%20Memories%20and%20Beyond.pdf , pp. 991-1002.

* cited by examiner

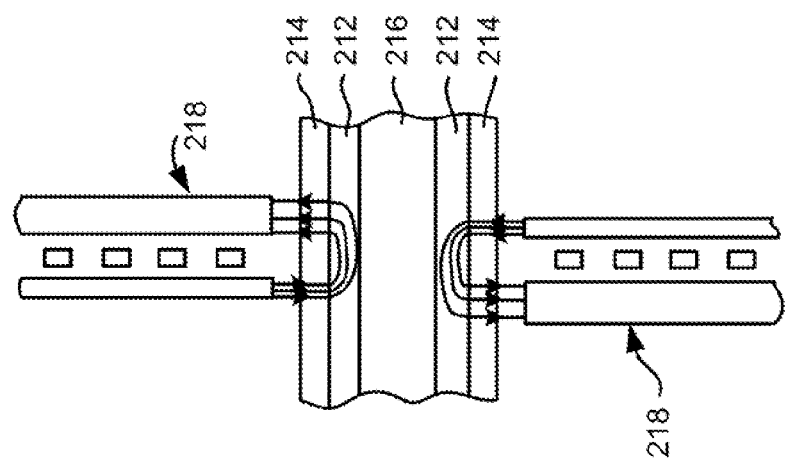
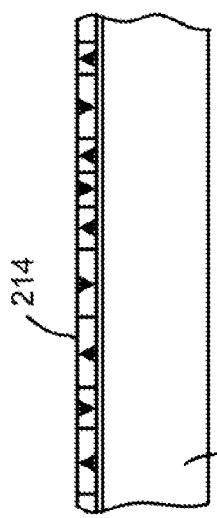
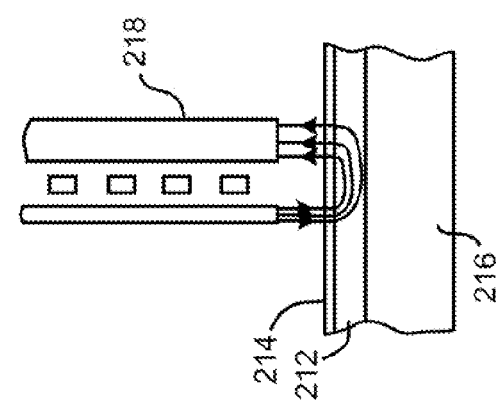
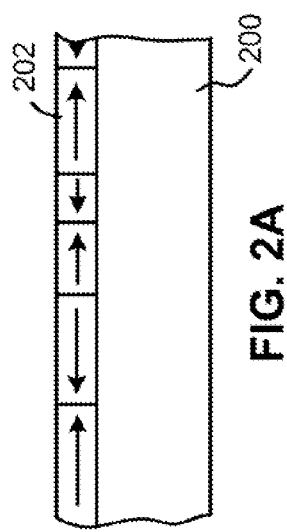
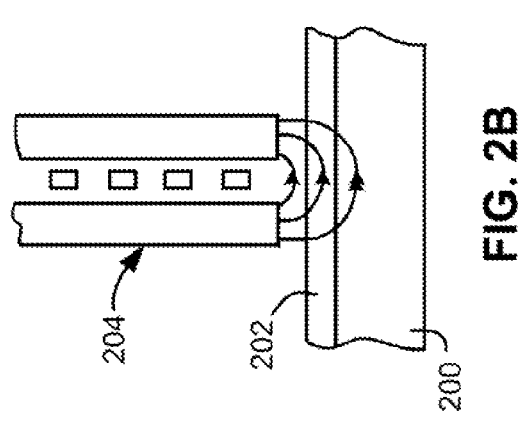

HIGH SPIN-TORQUE EFFICIENCY SPIN-TORQUE OSCILLATOR (STO) WITH DUAL SPIN POLARIZATION LAYER

FIELD OF THE INVENTION

The present invention relates to perpendicular magnetic recording, and particularly to the structure of a perpendicular magnetic recording head for use in a magnetic disk drive.

BACKGROUND

Recently, microwave-assisted magnetic recording (MAMR) has been used as a recording method for improving the surface recording density of magnetic media, such as magnetic disks used in magnetic disk drives. In MAMR, in addition to the magnetic field that emanates from the main pole, an alternating current (AC) magnetic field from a spin-torque oscillator (STO) is applied to a medium. High quality magnetic recording is facilitated due to the coercive force of the medium being lowered when the AC magnetic field is applied to the medium. Thus, in MAMR, it is important to develop an STO that generates a sufficiently large AC magnetic field in order to effect the lowering of the coercive force of the medium.

As shown in FIG. 5, according to the prior art, a STO 500 may be constructed from a field generation layer (FGL) 502 for generating an AC magnetic field, an interlayer (also referred to as a spacer) 504, and a spin polarization layer (SPL) 506 for transmitting the spin polarized torque. By conducting current 510 to the STO 500 when a magnetic field 508 is applied from a writer to the STO 500, the STO 500 oscillates, and an AC magnetic field is applied to the medium. In order to generate a large AC magnetic field, by effectively providing the spin torque, the STO 500 must oscillate in a state where the entire magnetization of the FGL 502 is directed in-plane.

A structure that directly laminates a perpendicular anisotropic film below or above the FGL 502 has also been used. The objective of this structure is to produce a single magnetic domain which emanates from the various FGL 502 magnetic domains.

However, an adequate assist effect cannot be obtained because the AC magnetic field that is generated in the STO 500 structures used currently is low. Thus, the magnitude of the spin torque hitting the FGL 502 is not sufficiently strong. One reason for this is that because the spin torque acts strongly at the boundary plane of the FGL 502 and the SPL 506, the FGL 502 magnetization at a position close to the SPL 506 is oriented in the in-plane direction of the film. However, the FGL 502 magnetization at a position far from the SPL 506 is oriented in the direction perpendicular to the film. Therefore, the problem in the development of the STO 500 capable of generating a high AC magnetic field is to orient all of the FGL magnetization in the film plane.

SUMMARY

In one embodiment, a microwave-assisted magnetic recording (MAMR) head includes a main magnetic pole, a spin-torque oscillator (STO) positioned near the main magnetic pole, the STO including a first perpendicular magnetic layer positioned above the main magnetic pole, wherein the first perpendicular magnetic layer is a first spin polarization layer (SPL 1) having an axis of magnetic anisotropy in a direction perpendicular to a film surface, a first non-magnetic transmission layer (spacer layer 1) positioned above the first perpendicular magnetic layer, a magnetic layer effectively having a plane of easy magnetization in the film surface positioned above the first non-magnetic transmission layer, the magnetic layer being a field generation layer (FGL), a second non-magnetic transmission layer (spacer layer 2) positioned above the magnetic layer, and a second perpendicular magnetic layer positioned above the second non-magnetic transmission layer, wherein the second perpendicular magnetic layer is a second spin polarization layer (SPL 2) having magnetic anisotropy in the direction perpendicular to the film plane.

In another embodiment, a method for forming a MAMR head includes forming a main magnetic pole above a substrate, forming a first perpendicular magnetic layer above the main magnetic pole, wherein the first perpendicular magnetic layer is a first spin polarization layer (SPL 1) having an axis of magnetic anisotropy in a direction perpendicular to a film surface, forming a first non-magnetic transmission layer (spacer layer 1) above the first perpendicular magnetic layer, forming a magnetic layer above the first non-magnetic transmission layer, the magnetic layer being a FGL and effectively having a plane of easy magnetization in the film surface, forming a second non-magnetic transmission layer (spacer layer 2) above the magnetic layer, and forming a second perpendicular magnetic layer above the second non-magnetic transmission layer, wherein the second perpendicular magnetic layer is a second spin polarization layer (SPL 2) having magnetic anisotropy in the direction perpendicular to the film plane.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a microwave-assisted magnetic recording (MAMR) head includes a main magnetic pole, a spin-torque oscillator (STO) positioned near the main magnetic pole, the STO including a first perpendicular magnetic layer positioned above the main magnetic pole, wherein the first perpendicular magnetic layer is a first spin polarization layer (SPL 1) having an axis of magnetic anisotropy in a direction perpendicular to a film surface, a first non-magnetic transmission layer (spacer layer 1) positioned above the first perpendicular magnetic layer, a magnetic layer effectively having a plane of easy magnetization in the film surface positioned above the first non-magnetic transmission layer, the magnetic layer being a field generation layer (FGL), a second non-magnetic transmission layer (spacer layer 2) positioned above the magnetic layer, and a second perpendicular magnetic layer positioned above the second non-magnetic transmission layer, wherein the second perpendicular magnetic layer is a second spin polarization layer (SPL 2) having magnetic anisotropy in the direction perpendicular to the film plane.

In another general embodiment, a method for forming a MAMR head includes forming a main magnetic pole above a substrate, forming a first perpendicular magnetic layer above the main magnetic pole, wherein the first perpendicular magnetic layer is a first spin polarization layer (SPL 1) having an axis of magnetic anisotropy in a direction perpendicular to a film surface, forming a first non-magnetic transmission layer (spacer layer 1) above the first perpendicular magnetic layer, forming a magnetic layer above the first non-magnetic transmission layer, the magnetic layer being a FGL and effectively having a plane of easy magnetization in the film surface, forming a second non-magnetic transmission layer (spacer layer 2) above the magnetic layer, and forming a second perpendicular magnetic layer above the second non-magnetic transmission layer, wherein the second perpendicular magnetic layer is a second spin polarization layer (SPL 2) having magnetic anisotropy in the direction perpendicular to the film plane.

Figure 1:
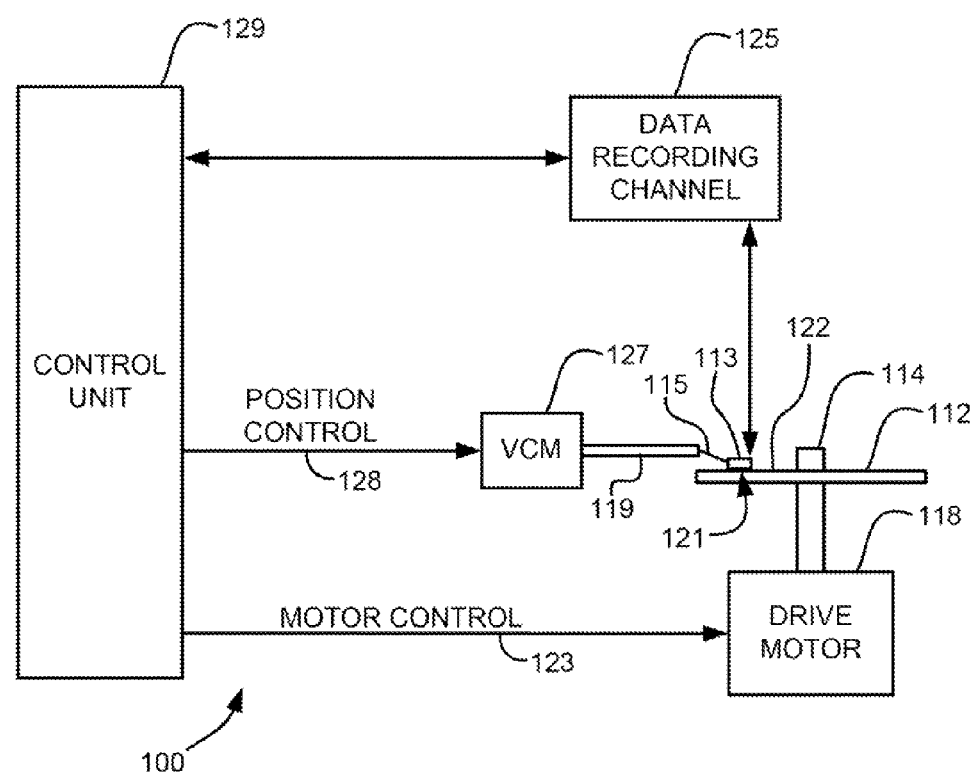
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 using a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "intermediate layer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
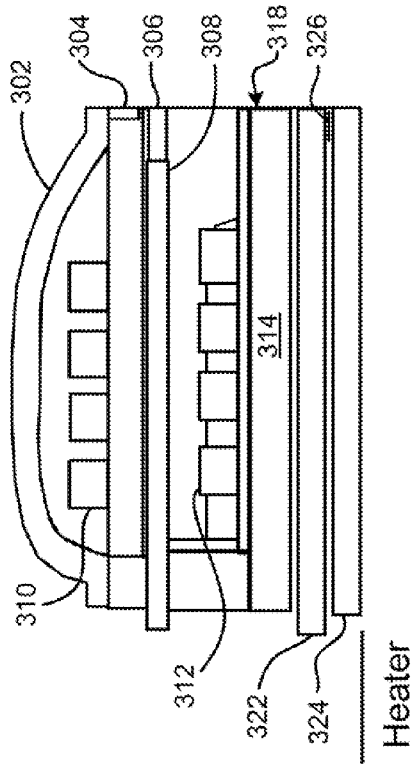
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
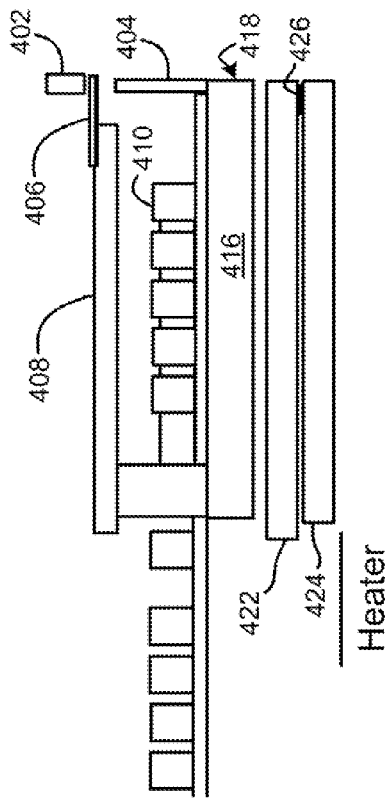
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
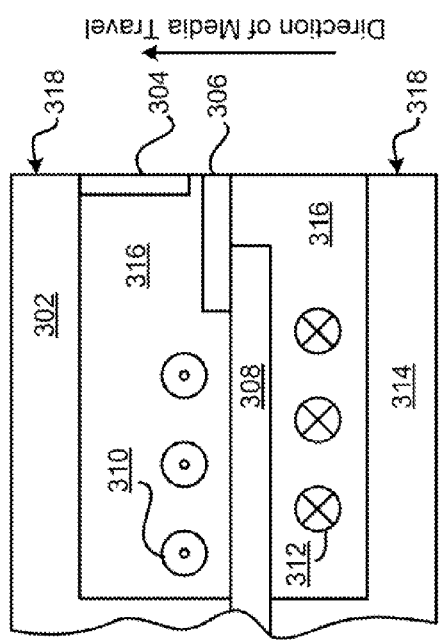
FIG. 4A is a cross-sectional view of one particular embodiment of a perpendicular magnetic head with looped coils.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
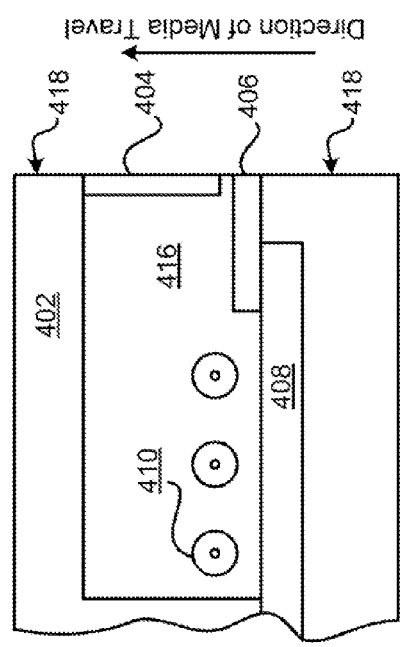
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

Figure 6:
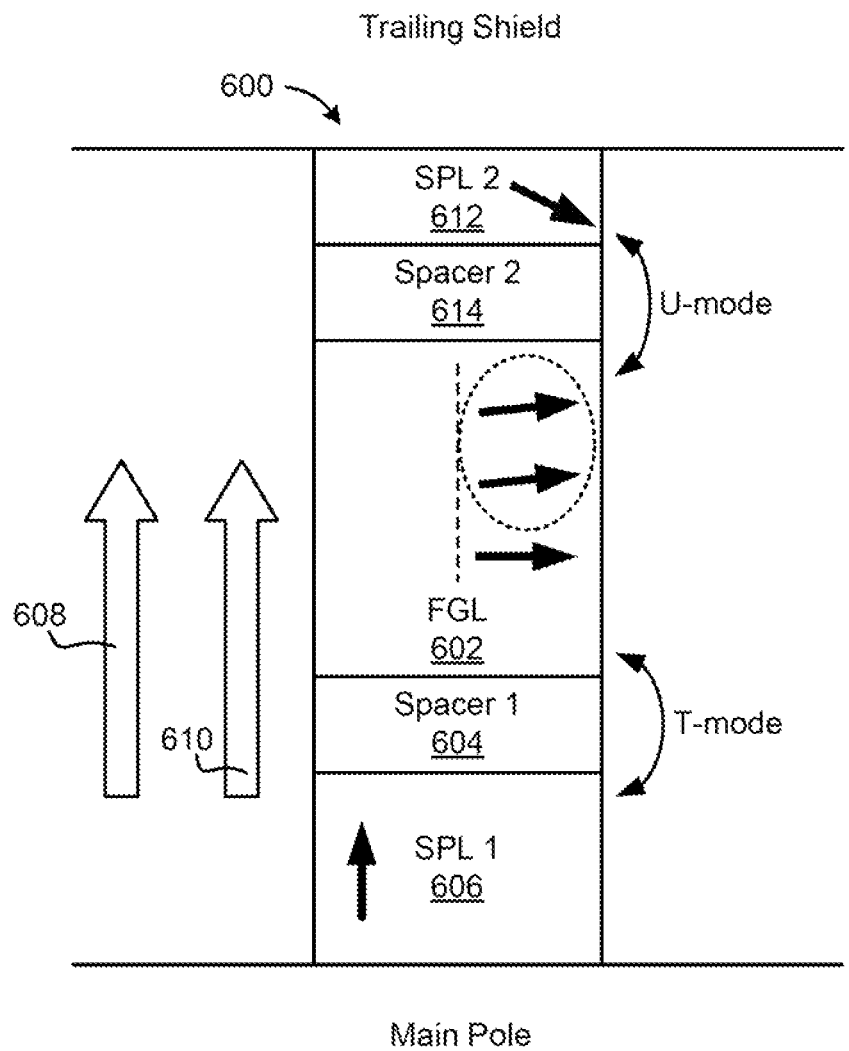
FIG. 6 is a simplified drawing of a proposed structure using a STO, according to one embodiment.

Now referring to FIG. 6, a spin-torque oscillator (STO) 600 is shown according to one embodiment in context with other components of a magnetic head. This STO 600 may be used with a microwave-assisted magnetic recording (MAMR) head, according to various embodiments. The STO 600 has a first spin polarization layer (SPL 1) 606 below a first spacer layer (Spacer 1) 604, which is positioned below a field generation layer (FGL) 602, and then a second spacer layer (Spacer 2) 614 and a second SPL (SPL 2) 612.

Figure 7:
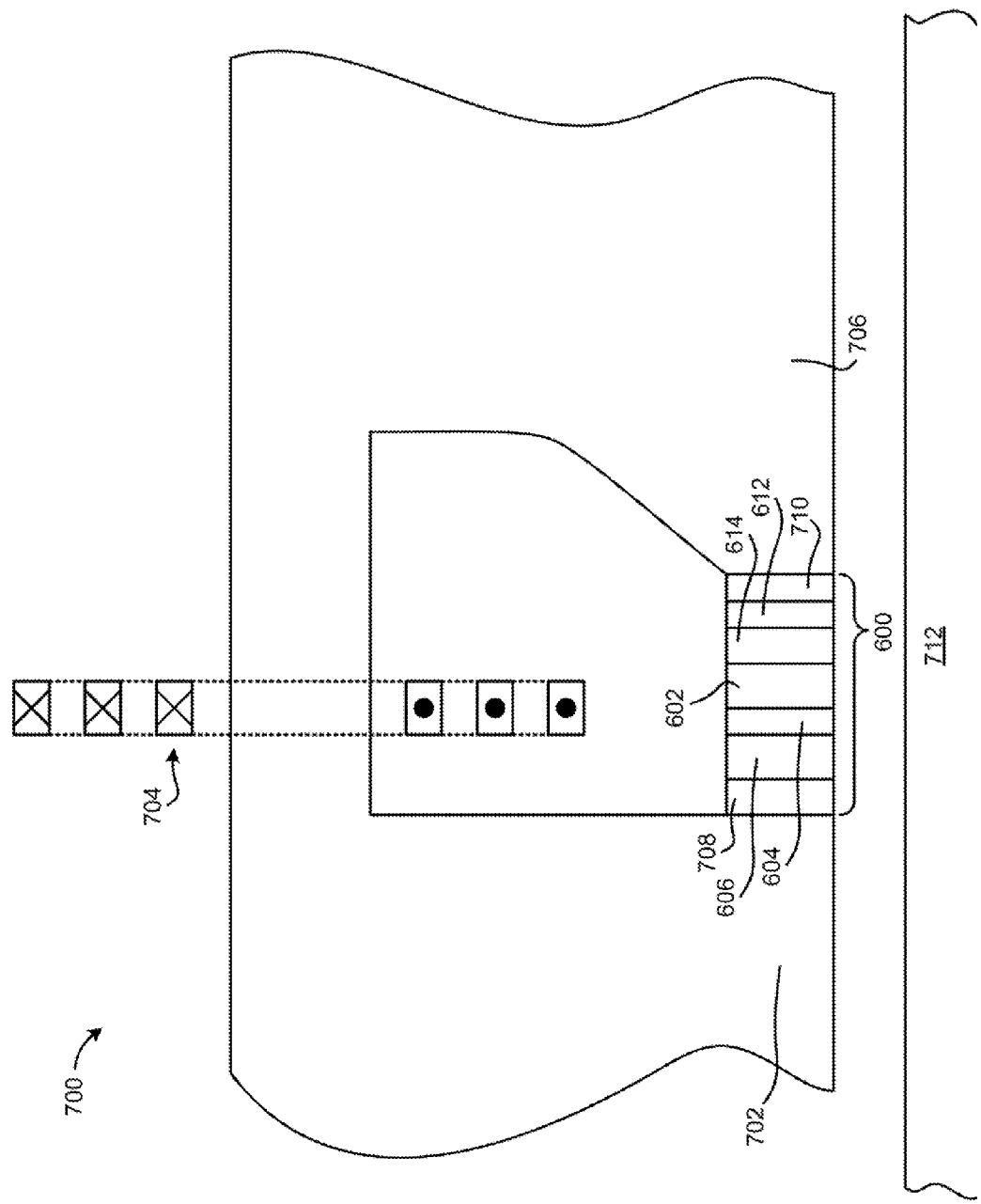
FIG. 7 shows a simplified drawing of a proposed perpendicular magnetic recording head, according to one embodiment.

As shown in FIG. 7, a magnetic recording head 700 may comprise an STO 600 for generating an alternating current (AC) magnetic field, a main magnetic pole 702 for generating a recording head magnetic field, a coil 704 for exciting the magnetic field in the main magnetic pole 702, and a trailing shield 706. Although not shown in FIG. 7, side shields may be provided on the exterior in the track width direction of the main magnetic pole 702 according to some approaches. In addition, a magnetic recording medium 712, as shown in FIG. 7 for reference, may be provided, but is not a portion of the magnetic head 700.

The STO 600 comprises an underlayer 708, a SPL 1 606, a first non-magnetic interlayer (Spacer 1) 604, a FGL 602, a second non-magnetic interlayer (Spacer 2) 614, a SPL 2 612, and a cap layer 710. The current applied to the STO 600 is in the direction from the SPL 1 606 to the SPL 2 612, as indicated in FIG. 6. Preferably, the underlayer 708 and the cap layer 710 may comprise conductive metal materials. In this structural example, the underlayer 708, according to various embodiments, may be from about 0.5 nm to about 5 nm, such as about 2 nm, and may comprise any suitable material, such as Ta. The cap layer 710, according to various embodiments, may be from about 0.5 nm to about 5 nm, such as about 2 nm, and may comprise any suitable material, such as Cr. The FGL 602, according to various embodiments, may be from about 9 nm to about 15 nm, such as about 12 nm, and may comprise any suitable material, such as CoFe or a CoFe alloy incorporating some other element(s).

The perpendicular anisotropic magnetic field (Hk) may be about zero, in some approaches. The saturated magnetization (Ms) may be about 2.3 T in some approaches. From the perspective of increasing the in-plane component of the FGL magnetization, a preferred material has a larger saturated magnetization and zero or negative perpendicular anisotropic energy. Both of the first and second non-magnetic interlayers (Spacers 1 and 2) 604, 614 may comprise Cu and may have a film thickness from about 0.5 nm to about 5 nm, such as about 2 nm in one approach. The material of the non-magnetic interlayers 604, 614 may be any nonmagnetic conductive metal material and is not restricted to any particular material.

Both the SPL 1 606 and SPL 2 612 may comprise any suitable material, such as Co/Ni or some alloy thereof, in some approaches. A film thickness ($t\_SPL1$) of the SPL 1 606 may be from about 5 nm to about 15 nm, such as about 9 nm in one approach. A film thickness ($t\_SPL2$) of the SPL 2 612 may be from about 0.5 nm to about 6 nm, such as about 3 nm in one approach. The Ms of both SPL 1 606 and SPL 2 612 may be about 1.2 T in one approach. The perpendicular anisotropic magnetic field may be about 13 kOe in one approach. Both SPL 1 606 and SPL 2 612 have a perpendicular anisotropic magnetic field and satisfy the following relationships:

$$t\_SPL1 \geq 2(t\_SPL2) \quad \text{Equation 1}$$

$$t\_SPL1 \geq 3.0 \text{ nm} \quad \text{Equation 2}$$

$$t\_SPL2 \geq 0.5 \text{ nm} \quad \text{Equation 3}$$

Furthermore, the direction of current flow is from SPL 1→FGL→SPL 2, according to preferred embodiments.

Figure 8:
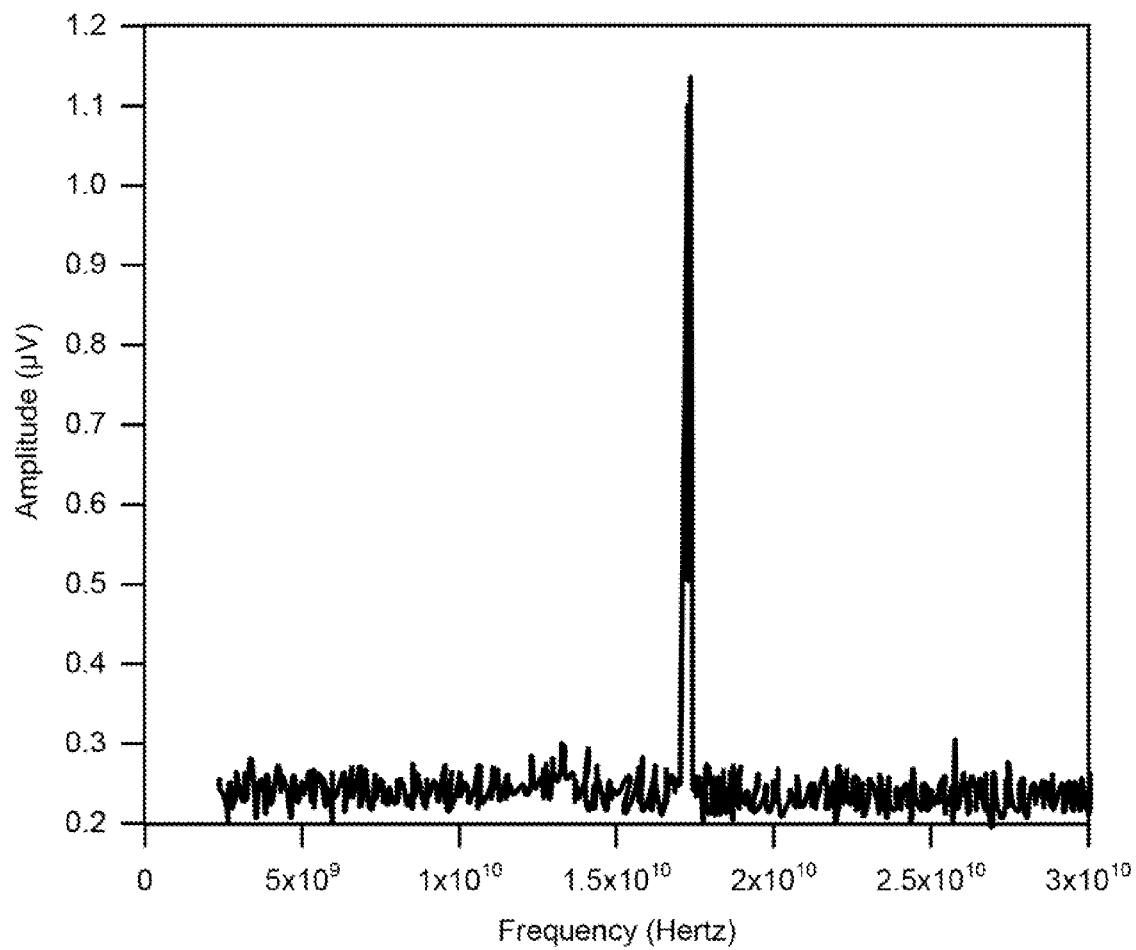
FIG. 8 shows oscillations produced by a proposed structure, according to one embodiment.
Figure 9:
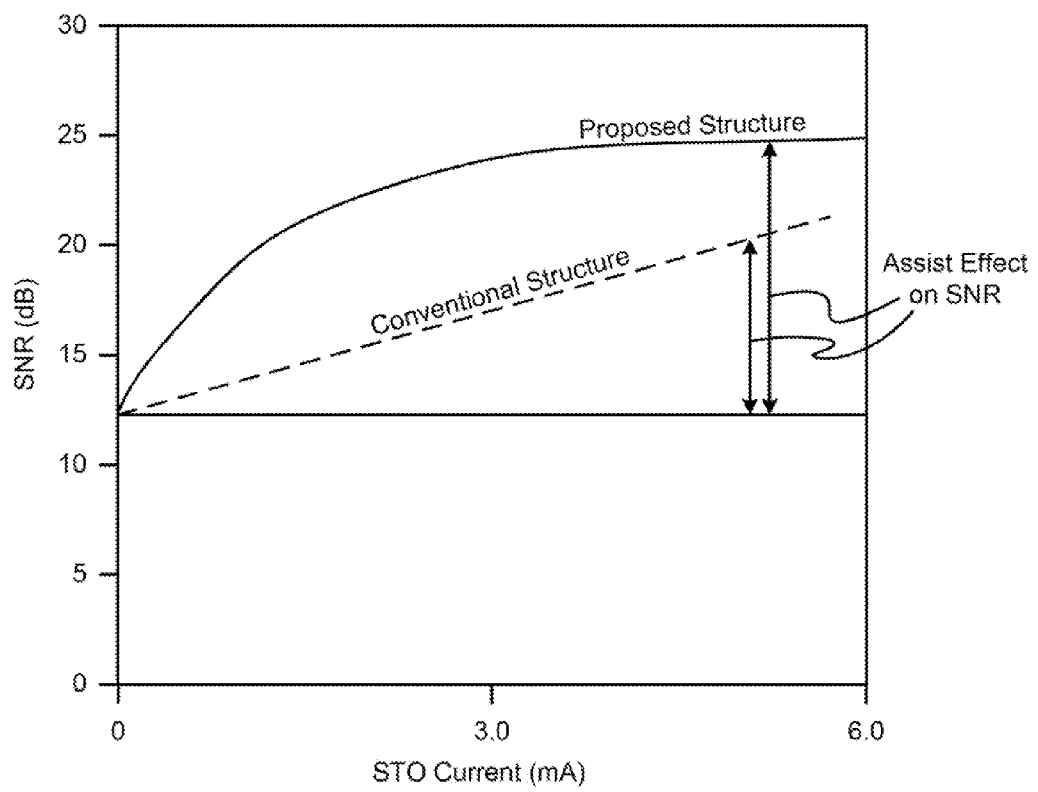
FIG. 9 shows a relationship between the signal-to-noise ratio (SNR) and a STO current for a conventional structure and a proposed structure.

According to this structure, good oscillations as shown in FIG. 8 may be realized. Also, an assist effect greater than that of the conventional structure shown in FIG. 9 is obtainable.

Figure 10:
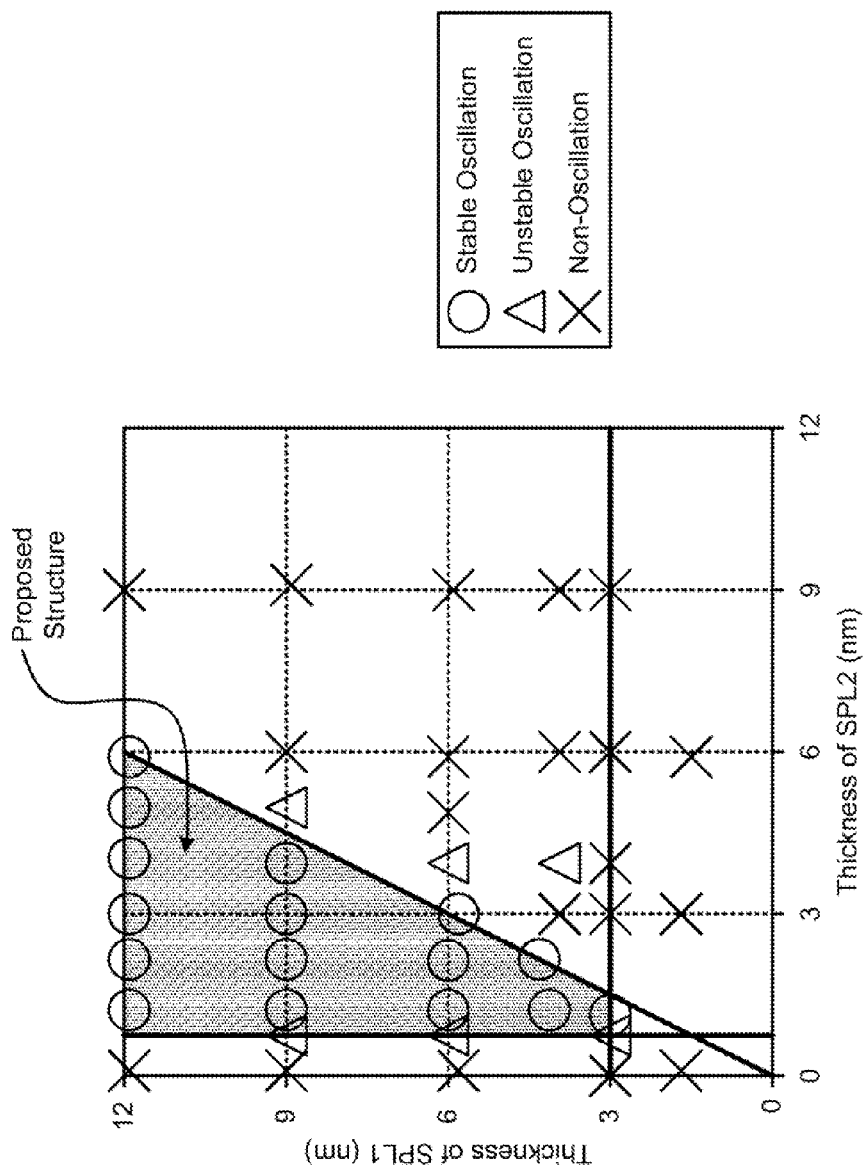
FIG. 10 shows oscillation performance of a STO for varying film thicknesses of the first and second spin polarization layers in accordance with the proposed structure, according to one embodiment.

FIG. 10 shows the oscillation performance of an STO for varying film thicknesses of the SPL 1 and SPL 2 in accordance with the proposed structure. The structural example shown in FIG. 6 corresponds to the proposed structure and exhibits good oscillations, as shown in FIG. 8. In addition, it is clear that good oscillations are exhibited in the range satisfying Equations 1-3.

Next, some factors for obtaining the higher AC magnetic field in the proposed structure are described below, according to one embodiment. As shown in FIG. 6, the proposed structure simultaneously starts T-mode oscillations caused by interactions between the SPL 1 606 and the FGL 602, along with U-mode oscillations caused by interactions between the SPL 2 612 and the FGL 602. The name T-mode originates from the T-shaped magnetization of the FGL 602 and the SPL 1 606. In addition, the name U-mode originates from the U-shaped magnetization of the FGL 602 and the SPL 2 612. T-mode oscillations play a role in increasing the in-plane component of the magnetization of the FGL 602 on the SPL 1 side. U-mode oscillations play a role in increasing the in-plane component of the magnetization of FGL 602 on the SPL 2 side.

Figure 5:
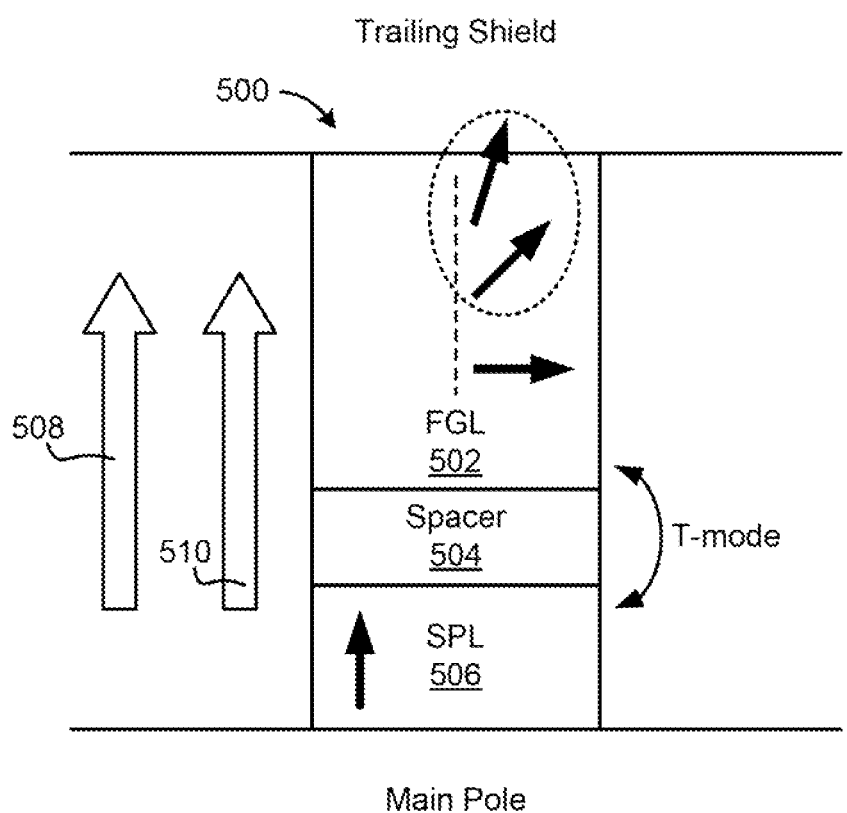
FIG. 5 is a simplified drawing of a conventional structure using a spin-torque oscillator (STO), according to the prior art.

As a result, the intensity of the AC magnetic field generated by the FGL 602 is increased over the ability of the conventional structure 500 shown in FIG. 5. These oscillations cannot be realized by simply layering only a single SPL 506 above and/or below the FGL 502.

Referring again to FIG. 6, in T-mode oscillations, spin torque reflected from the SPL 1 606 is applied to the FGL 602, and the FGL 602 oscillates. Therefore, current is conducted in the direction from the SPL 1 606 to the FGL 602. The magnetization of the SPL 1 606 remains stable in the direction of the film thickness in order to efficiently transmit the spin torque from the SPL 1 606. In T-mode oscillations, the SPL 1 606 remains stably oriented in the perpendicular direction. It is noted that the film thickness of the SPL 1 606 should be at least 3.0 nm in order to satisfy Equation 2.

In addition, U-mode oscillations are realized by maintaining the SPL 2 612 and the FGL 602 in the antiparallel state. In the U-mode, the magnetization of the SPL 2 612 affects the spin torque and oscillations start. In contrast, in the T-mode, the current is applied from the FGL 602 to the SPL 2 612. Furthermore, the film thickness of the SPL 2 612 should be sufficiently thin so that the SPL 2 612 easily orients in the in-plane direction. As the film thickness of the SPL 2 612 thins, the anisotropic magnetization in the effective perpendicular direction becomes small, and the spin torque effect acts strongly. While the stability of the SPL 1 606 magnetization is maintained, the SPL 2 612 is effectively oscillated. Therefore, the film thickness of the SPL 2 612 may be less than half the film thickness of the SPL 1 606 as shown in Equation 1. In addition, if the film thickness of the SPL 1 606 is too thin, the SPL 1 606 divides into multiple domains and no longer oscillates. As shown in Equation 3, the film thickness of the SPL 1 606 should be at least 0.5 nm in order to satisfy the equation. In addition, more preferably, the film thickness may be about 1.0 nm or greater in order to have stable oscillations.

According to the proposed structure, by increasing the in-plane component of the FGL magnetization of a STO 600, a MAMR head having a strong AC magnetic field may be realized.

Figure 11:
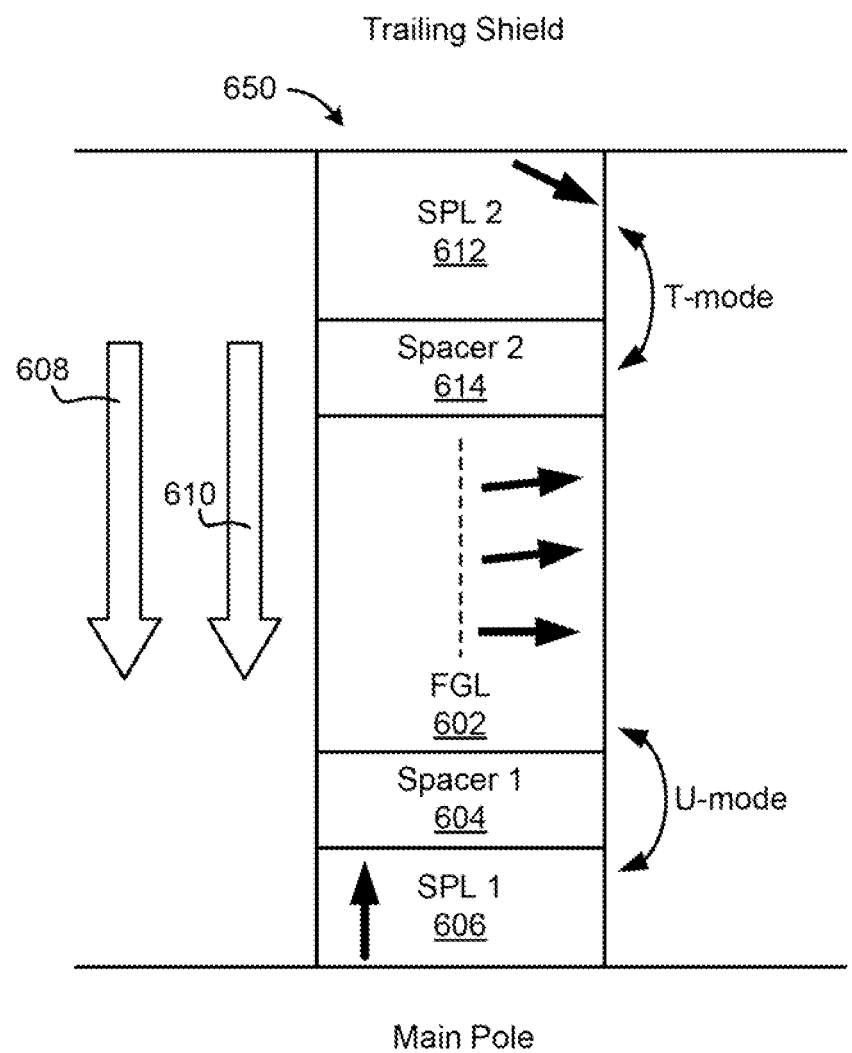
FIG. 11 shows a simplified drawing of a proposed structure using a STO, according to another embodiment.

FIG. 11 shows another structural example based on one embodiment. This STO 650 may be used with a MAMR head, according to various embodiments. The proposed structure in FIG. 11 is similar to the proposed structure in FIG. 6 other than the STO 650 shown in FIG. 11. The STO 650 has different film thicknesses for the SPL 1 606 and the SPL 2 612. A difference is that the direction of the conducting current 610 (and external magnetic field 608) is the direction from SPL 2 612 to SPL 1 606. In this proposed structure shown in FIG. 11, according to one embodiment, the film thickness of SPL 1 606 may be from about 1 nm to about 6 nm, such as about 3 nm, and the film thickness of the SPL 2 612 may be from about 6 nm to about 12 nm, such as about 9 nm. The SPL 1 606 and SPL 2 612 may satisfy the following equations, in one embodiment.

$$t\_SPL2 \geq 2(t\_SPL1) \quad \text{Equation 4}$$

$$t\_SPL2 \geq 3.0 \text{ nm} \quad \text{Equation 5}$$

$$t\_SPL1 \geq 0.5 \text{ nm} \quad \text{Equation 6}$$

Furthermore, the direction of current flow is from SPL 2→FGL→SPL 1. According to this proposed structure shown in FIG. 11, a high AC magnetic field may be realized because the SPL 1 606 and the FGL 602 may realize U-mode oscillations, and the FGL 602 and the SPL 2 612 may realize T-mode oscillations.

A prototype spin-torque oscillator (STO) was fabricated according to one embodiment, and the oscillations produced thereof were evaluated. The steep oscillation peak shown in FIG. 8 was measured. Table 1 shows an example of the STO oscillation frequency, the AC magnetic field, and the assist effect obtained by a proposed structure shown in FIG. 6, according to one embodiment, and a conventional structure as shown in FIG. 5.

TABLE 1

|  | Conventional Structure | Proposed Structure |
| --- | --- | --- |
| Frequency (GHz) | 18 GHz | 18 GHz |
| AC Field (Oe) | 600 Oe | 1000 Oe |
| Assist Effect (dB) | 8 dB | 13 dB |
| SNR (dB) | 20 dB | 25 dB |

The oscillation frequencies of the structure of the present invention and the ordinary structure do not differ significantly, but the AC magnetic field is larger in the proposed structure. The reason is that the in-plane component of the FGL magnetization increases because the spin torque applied to the FGL increases.

FIG. 9 shows a relationship between the SNR and the STO current for a conventional structure and the proposed structure, as shown in FIGS. 5-6, respectively. As the STO current increases in both structures, the SNR improves. However, in contrast to the conventional structure in which the SNR does not saturate, the SNR saturates in the proposed structure. The current value that may be applied to the STO has a maximum from the perspective of the reliability of the element. Therefore, in a practical application range, the proposed structure has a higher SNR than that of the conventional structure. For example, when the STO current is 5 mA, the assist effect of the proposed structure is 13 dB that is 8 dB higher than that of the conventional structure. Furthermore, the proposed structure can generate a higher intensity AC magnetic field than the conventional structure to effectively increase the SNR.

Figure 12:
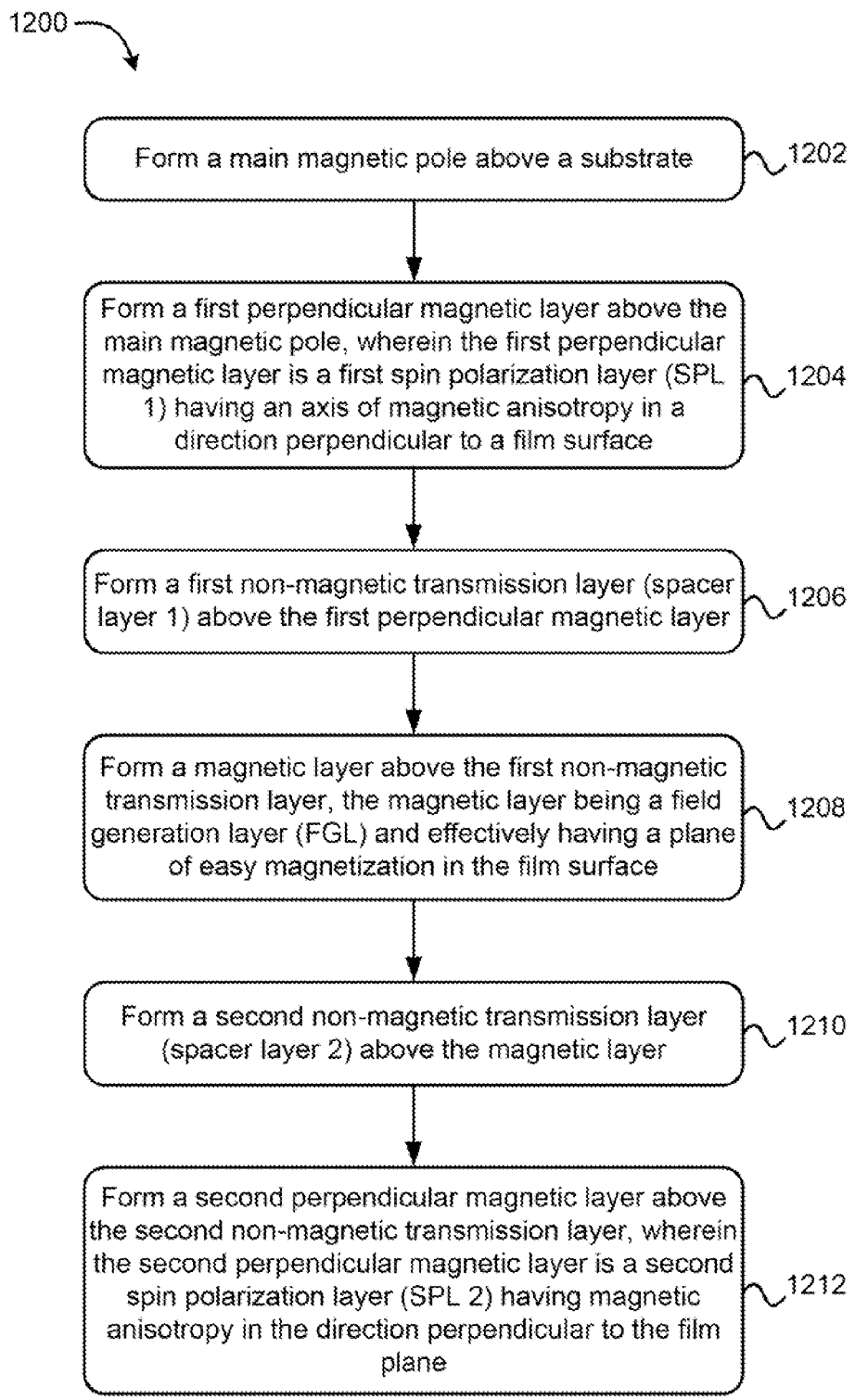
FIG. 12 shows a flow chart of a method, according to one embodiment.

Now referring to FIG. 12, a method 1200 for forming a MAMR head is shown according to one embodiment. The method 1200 may be performed in conjunction with any desired environment, including those shown in FIGS. 1-11, in various embodiments. Of course, more or less operations than those specifically shown in FIG. 12 may be included in method 1200, as would be understood by one of skill in the art.

In operation 1202, a main magnetic pole is formed above a substrate using any formation known in the art, such as sputtering, plating, ion deposition, etc.

In operation 1204, a first perpendicular magnetic layer is formed above the main magnetic pole. The first perpendicular magnetic layer is a first spin polarization layer (SPL 1) having an axis of magnetic anisotropy in a direction perpendicular to a film surface, and may be formed using any technique known in the art.

In operation 1206, a first non-magnetic transmission layer (spacer layer 1) is formed above the first perpendicular magnetic layer and may be formed using any formation technique known in the art.

In operation 1208, a magnetic layer is formed above the first non-magnetic transmission layer, the magnetic layer being a FGL and effectively having a plane of easy magnetization in the film surface and may be formed using any formation technique known in the art.

In operation 1210, a second non-magnetic transmission layer (spacer layer 2) is formed above the magnetic layer and may be formed using any formation technique known in the art.

In operation 1212, a second perpendicular magnetic layer is formed above the second non-magnetic transmission layer and may be formed using any formation technique known in the art. The second perpendicular magnetic layer is a second spin polarization layer (SPL 2) having magnetic anisotropy in the direction perpendicular to the film plane.

In one approach, a film thickness of the first perpendicular magnetic layer may be greater than a film thickness of the second perpendicular magnetic layer, and a current flows from the first perpendicular magnetic layer to the second perpendicular magnetic layer during operation of the MAMR head.

In a further approach, a film thickness of the first perpendicular magnetic layer may be at least twice a film thickness of the second perpendicular magnetic layer. The film thickness of the first perpendicular magnetic layer may be at least about 3 nm, and the film thickness of the second perpendicular magnetic layer may be at least about 0.5 nm.

In one embodiment, a film thickness of the first perpendicular magnetic layer may be less than a film thickness of the second perpendicular magnetic layer, and current flows from the second perpendicular magnetic layer to the first perpendicular magnetic layer during operation of the MAMR head.

In another embodiment, a film thickness of the second perpendicular magnetic layer may be at least twice a film thickness of the first perpendicular magnetic layer, and wherein current flows from the second perpendicular magnetic layer to the first perpendicular magnetic layer during operation of the MAMR head. In a further embodiment, the film thickness of the second perpendicular magnetic layer may be at least about 3 nm, and the film thickness of the first perpendicular magnetic layer may be at least about 0.5 nm.

Furthermore, in another approach, the first perpendicular magnetic layer and/or the second perpendicular magnetic layer comprise at least one of: Co/Ni, Co/Pd, Co/Pt, Co/Fe, and alloys thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A microwave-assisted magnetic recording (MAMR) head, comprising:
   a main magnetic pole;
   a spin-torque oscillator (STO) positioned near the main magnetic pole, the STO comprising:
      a first perpendicular magnetic layer positioned above the main magnetic pole, wherein the first perpendicular magnetic layer is a first spin polarization layer (SPL 1) having an axis of magnetic anisotropy in a direction of film thickness that is perpendicular to a film surface;

a first non-magnetic transmission layer (spacer layer 1) positioned above and directly adjacent the first perpendicular magnetic layer;

a magnetic layer effectively having a plane of easy magnetization in the film surface positioned above and directly adjacent the first non-magnetic transmission layer, the magnetic layer being a field generation layer (FGL);

a second non-magnetic transmission layer (spacer layer 2) positioned above and directly adjacent the magnetic layer; and a second perpendicular magnetic layer positioned above and directly adjacent the second non-magnetic transmission layer, wherein the second perpendicular magnetic layer is a second spin polarization layer (SPL 2) having magnetic anisotropy in the direction of film thickness that is perpendicular to the film surface, wherein one of the first and second perpendicular magnetic layers is configured to undergo T-mode oscillations with the FGL, and wherein another of the first and second perpendicular magnetic layers is configured to undergo U-mode oscillations with the FGL.

2. The MAMR head as recited in claim 1, wherein a film thickness of the first perpendicular magnetic layer is greater than a film thickness of the second perpendicular magnetic layer.

3. The MAMR head as recited in claim 2, wherein a current flows from the first perpendicular magnetic layer to the second perpendicular magnetic layer during operation of the MAMR head.

4. The MAMR head as recited in claim 1, wherein a film thickness of the first perpendicular magnetic layer is at least twice a film thickness of the second perpendicular magnetic layer, and wherein a current flows from the first perpendicular magnetic layer to the second perpendicular magnetic layer during operation of the MAMR head.

5. The MAMR head as recited in claim 4, wherein the film thickness of the first perpendicular magnetic layer is at least about 3 nm, and wherein the film thickness of the second perpendicular magnetic layer is at least about 0.5 nm.

6. The MAMR head as recited in claim 3, wherein the first perpendicular magnetic layer is configured to undergo T-mode oscillation with the FGL, and wherein the second perpendicular magnetic layer is configured to undergo U-mode oscillations with the FGL.

7. The MAMR head as recited in claim 1, wherein a film thickness of the first perpendicular magnetic layer is less than a film thickness of the second perpendicular magnetic layer.

8. The MAMR head as recited in claim 7, wherein current flows from the second perpendicular magnetic layer to the first perpendicular magnetic layer during operation of the MAMR head, wherein the first perpendicular magnetic layer is configured to undergo U-mode oscillation with the FGL, and wherein the second perpendicular magnetic layer is configured to undergo T-mode oscillations with the FGL.

9. The MAMR head as recited in claim 1, wherein a film thickness of the second perpendicular magnetic layer is at least twice a film thickness of the first perpendicular magnetic layer, and wherein current flows from the second perpendicular magnetic layer to the first perpendicular magnetic layer during operation of the MAMR head.

10. The MAMR head as recited in claim 9, wherein the film thickness of the second perpendicular magnetic layer is at least about 3 nm.

11. The MAMR head as recited in claim 9, wherein the film thickness of the first perpendicular magnetic layer is at least about 0.5 nm.

12. The MAMR head as recited in claim 1, wherein the first perpendicular magnetic layer and the second perpendicular magnetic layer comprise at least one of: Co/Ni, Co/Pd, Co/Pt, Co/Fe, and alloys thereof.

13. A magnetic data storage system, comprising:
at least one MAMR head as recited in claim 1;
a perpendicular magnetic recording medium;
a drive mechanism for passing the magnetic recording medium over the at least one MAMR head; and
a controller electrically coupled to the at least one MAMR head for controlling operation of the at least one MAMR head.

14. A method for forming a microwave-assisted magnetic recording (MAMR) head, the method comprising:
forming a main magnetic pole above a substrate;
forming a first perpendicular magnetic layer above the main magnetic pole, wherein the first perpendicular magnetic layer is a first spin polarization layer (SPL 1) having an axis of magnetic anisotropy in a direction of film thickness that is perpendicular to a film surface;
forming a first non-magnetic transmission layer (spacer layer 1) above and directly adjacent the first perpendicular magnetic layer;
forming a magnetic layer above and directly adjacent the first non-magnetic transmission layer, the magnetic layer being a field generation layer (FGL) and effectively having a plane of easy magnetization in the film surface;
forming a second non-magnetic transmission layer (spacer layer 2) above and directly adjacent the magnetic layer; and
forming a second perpendicular magnetic layer above and directly adjacent the second non-magnetic transmission layer, wherein the second perpendicular magnetic layer is a second spin polarization layer (SPL 2) having magnetic anisotropy in the direction of film thickness that is perpendicular to the film surface,
wherein one of the first and second perpendicular magnetic layers is configured to undergo T-mode oscillations with the FGL, and
wherein another of the first and second perpendicular magnetic layers is configured to undergo U-mode oscillations with the FGL.

15. The method as recited in claim 14, wherein a film thickness of the first perpendicular magnetic layer is greater than a film thickness of the second perpendicular magnetic layer, wherein a current flows from the first perpendicular magnetic layer to the second perpendicular magnetic layer during operation of the MAMR head, wherein the first perpendicular magnetic layer is configured to undergo T-mode oscillation with the FGL, and wherein the second perpendicular magnetic layer is configured to undergo U-mode oscillations with the FGL.

16. The method as recited in claim 14, wherein a film thickness of the first perpendicular magnetic layer is at least twice a film thickness of the second perpendicular magnetic layer, wherein the film thickness of the first perpendicular magnetic layer is at least about 3 nm, wherein the film thickness of the second perpendicular magnetic layer is at least about 0.5 nm, wherein the first perpendicular magnetic layer is configured to undergo T-mode oscillation with the FGL, and wherein the second perpendicular magnetic layer is configured to undergo U-mode oscillations with the FGL.

17. The method as recited in claim 14, wherein a film thickness of the first perpendicular magnetic layer is less than a film thickness of the second perpendicular magnetic layer, wherein current flows from the second perpendicular magnetic layer to the first perpendicular magnetic layer during operation of the MAMR head, wherein the first perpendicular magnetic layer is configured to undergo U-mode oscillation with the FGL, and wherein the second perpendicular magnetic layer is configured to undergo T-mode oscillations with the FGL.

18. The method as recited in claim 14, wherein a film thickness of the second perpendicular magnetic layer is at least twice a film thickness of the first perpendicular magnetic layer, and wherein current flows from the second perpendicular magnetic layer to the first perpendicular magnetic layer during operation of the MAMR head.

19. The method as recited in claim 18, wherein the film thickness of the second perpendicular magnetic layer is at least about 3 nm, and wherein the film thickness of the first perpendicular magnetic layer is at least about 0.5 nm.

20. The method as recited in claim 14, wherein the first perpendicular magnetic layer and the second perpendicular magnetic layer comprise at least one of: Co/Ni, Co/Pd, Co/Pt, Co/Fe, and alloys thereof.

* * * * *

UNITED STATES PATENT AND TRADEMARK OFFICE
CERTIFICATE OF CORRECTION

PATENT NO. : 8,879,205 B2  
APPLICATION NO. : 13/675796  
DATED : November 4, 2014  
INVENTOR(S) : Shiimoto et al.

Page 1 of 1

It is certified that error appears in the above-identified patent and that said Letters Patent is hereby corrected as shown below:

In the specification:

col. 6, line 44 replace "38" with --3B--;

col. 7, line 35 replace "(t_SPL 1)" with --(t_SPL1)--;

col. 8, line 11 replace "FGL 5" with --FIG. 5--.

Signed and Sealed this  
Tenth Day of March, 2015

Michelle K. Lee  
*Deputy Director of the United States Patent and Trademark Office*